US007853958B2

(12) United States Patent
Mathew et al.

(10) Patent No.: US 7,853,958 B2
(45) Date of Patent: Dec. 14, 2010

(54) VIRTUAL MACHINE MONITOR MANAGEMENT FROM A MANAGEMENT SERVICE PROCESSOR IN THE HOST PROCESSING PLATFORM

(75) Inventors: Tisson Mathew, Beaverton, OR (US); Bithika Khargharia, Durham, NC (US)

(73) Assignee: Intel Corporation, Santa Clara, CA (US)

( * ) Notice: Subject to any disclaimer, the term of this patent is extended or adjusted under 35 U.S.C. 154(b) by 903 days.

(21) Appl. No.: 11/477,327

(22) Filed: Jun. 28, 2006

(65) Prior Publication Data

US 2008/0005748 A1    Jan. 3, 2008

(51) Int. Cl.
G06F 9/44 (2006.01)

(52) U.S. Cl. .......................................... 719/318; 718/1
(58) Field of Classification Search .................. None
See application file for complete search history.

(56) References Cited

U.S. PATENT DOCUMENTS 7,130,949 B2 * 10/2006 Belmar et al. ............... 710/260
7,467,204 B2 * 12/2008 Fields et al. ................ 709/224
2004/0260841 A1 * 12/2004 Mathew et al. ............. 709/250
2005/0132367 A1 * 6/2005 Tewari et al. .................. 718/1
2007/0011491 A1 * 1/2007 Govindarajan et al. ........ 714/27

OTHER PUBLICATIONS

Intelligent Platform Management Interface Specification, Second Generation, v2.0, Feb. 12, 2004, Intel Hewlett-Packard NEC Dell, 590 pages total, 78 relevant pages.*
G. Pruett, A. Abbondanzio, J. Bielski, T. D. Fadale, A. E. Merkin, Z. Rafalovich, L. A. Riedle, J. W. Simpson; BladeCenter systems management software; Nov. 2005; 13 pages.*
Thomas Deane, Jonathan Eunice; HP Systems Insight Manager: One Console to Rule Them All; Apr. 22, 2005; 6 pages.*
Haihong Zhuo, Jianwen Yin, Anil V. Rao; Remote Management with the Baseboard Management Controller in Eighth-Generation Dell PowerEdge Servers; Oct. 2004; 4 pages.*

* cited by examiner

Primary Examiner—Hyung S Sough
Assistant Examiner—Kimberly Jordan
(74) Attorney, Agent, or Firm—Blakely, Sokoloff, Taylor & Zafman LLP (57) ABSTRACT

A management service processor to provide management of virtual machine monitoring is described. In one example, an event on a computer system is monitored at a sensor of a management system residing on the computer system. A record of the event is generated in a generic data format. The event is signaled to the management system, and the record is sent to an event routing service of the management system.

20 Claims, 4 Drawing Sheets

VIRTUAL MACHINE MONITOR MANAGEMENT FROM A MANAGEMENT SERVICE PROCESSOR IN THE HOST PROCESSING PLATFORM

BACKGROUND

1. Field

The present description relates to the field of monitoring the operation of a computer system and, in particular, to monitoring activity in a partitioned service processor through virtual machines.

2. Related Art

Platforms that support virtualization normally use virtual machine systems (e.g. Virtual Machine Monitor or VMM) to orchestrate and provision virtual machines (VMs) on the fly. The VMM software system typically co-exists with the operating system (OS) to provide the functionality of resident software on the platform controlling access to all the resources that belong to that platform. On top of this resident software layer, sits the VMs running their individual applications within their own operating system shell. They either time-share the underlying physical resources or simultaneously execute with dedicated physical resources. This mapping from virtual machines to physical machines is achieved by the VMM either independently or in conjunction with the OS. These VMM controlled physical resources within a node or platform or blade can be instrumented to expose management rich information for use by the remote service processor.

A VM management platform, such as Intel Active Management Technology (iAMT), can be used to provide a secure execution environment in the form of an adjunct processor or a virtual partition that is isolated from the host processor for executing third party management capability extensions, called Capability Modules (CM's). iAMT implements a modular and extensible common platform interface called the Sensor Effector Interface (SEI). iAMT CMs can use SEI as a single interface for managing heterogeneous devices and instruments on the host platform. SEI uses a generic data virtual machine structure called a Resource Data Record (RDR) for describing managed resources including the sensors and controls, their relationships, and the operations which can be performed on them. It uses different types of RDRs for performing these tasks such as Sensor RDRs, Effector RDRs, Event RDRs and Association RDRs.

The basic structure of the RDR includes an RDR header and a data record. The header provides general information about the RDR such as the ID and the RDR type. The data record provides the monitored information that is of interest to the management platform. This information is specific to the RDR in question and may include information such as time stamps, source, resource codes, data fields or any other particular information for that type.

In order to access these RDRs, the SEI subsystem provides two interfaces, the mailbox interface through which messages can be exchanged between the management platform (iAMT) and the host platform in a secure manner, and a DMA memory scan interface through which the management platform (iAMT) can read the sensors or effectors directly off of the host's physical memory. Additionally, the SEI subsystem leverages existing platform management protocols such as IPMI (Intelligent Platform Management Interface) to access serial devices on the platform directly.

IPMI provides a technique for monitoring host hardware. However, there are no existing techniques for describing and managing Virtual Machine Monitors (VMMs) using such an interface.

BRIEF DESCRIPTION OF THE DRAWINGS

Embodiments of the present invention may be understood more fully from the detailed description given below and from the accompanying drawings of various embodiments of the invention. The drawings, however, should not be taken to be limiting, but are for explanation and understanding only.

DETAILED DESCRIPTION

The present description relates techniques of extending VMM managed resources on a host platform to expose management rich information for use by a platform management technology. One such technology is Intel's iAMT and VPro™. However, the principles, techniques, and structures described may be applied to a wide range of other platform management technologies. The described principles, techniques, and structures may also be used to collect that information in an out-of-band fashion completely bypassing the VMM.

One embodiment of the invention relates to instrumenting traditional VMMs for management from an isolated partition in the platform. Another embodiment of the invention applies instrumentation techniques to different types of VMMs. In one embodiment of the invention, loosely-coupled interactions are enabled between any type of VMM system and a service processor by adopting the management platform's generic data structures, such as RDR, for information exchange. Thus it has the ability to support management of heterogeneous VMM systems. The described embodiments may be used with different operating systems (OS) and different VMMs running on the host processor. They enable higher utilization of VMM managed host processors in terms of operational tasks by shifting the management responsibilities to the service processor or partition.

In one embodiment, the invention manages heterogeneous VMMs without the overhead of a Management Virtual Machine (MVM) or any agents in the VMM. This eliminates the need for a Service VM or a Management VM. It minimizes the problem resolution time by significantly reducing the amount of time required for problem isolation.

Management for the VMM may be done from an Isolated Management Engine such as a Service Processor or Baseboard Management Controller (BMC). This increases service and application availability by reducing MTTR (Mean Time To Repair). It improves performance by providing greater control over management resources over an out-of-band channel. It enables flexible configuration and administration of VMM and I/O (Input/Output) devices. Seamless interoperability may be offered with existing management interfaces using web services-based manageability. This enables System Administrators to dynamically adapt to changing I/O devices and it enables remote (out-of-band) troubleshooting capability into VMMs.

VMM management may be provided from an isolated execution partition in the platform. A mechanism may be provided for agents on an isolated partition to remotely monitor different types of VMMs. This frees the host processor to do more operational tasks by transferring management responsibilities over to the management/service processor.

When the VMM controls access to all the physical resources in a node, it may be aware of the actual usage and usability status of these resources at every instant. From a management point of view, this information may be extremely rich, giving indications of imminent resource failure, resource malfunction, and resource under-utilization, etc. However, this information may be lost due to the inability of current technologies to expose this information in a standard format for use by management platforms. Different types of VMMs may be instrumented to describe managed node resources in the standard RDR format for management by the CMs within the management platform.

In one embodiment of the invention, VMM exposes the management information as iAMT RDRs in memory (although other data structures may be used instead) and this information is collected by the SEI providers in an out-of-band fashion completely bypassing the VMM. This technique efficiently handles VMM failures and at the same time relieves the host platform processor from management activities so it can perform more operational workloads. This technique provides a more loosely coupled interaction between the host platform VMM and the service processor. For example, when the VMM exposes any RDR, it does not need to know who to expose the RDRs to. The service processor automatically figures out the source of that information from the information contained in the RDR.

Figure 1:
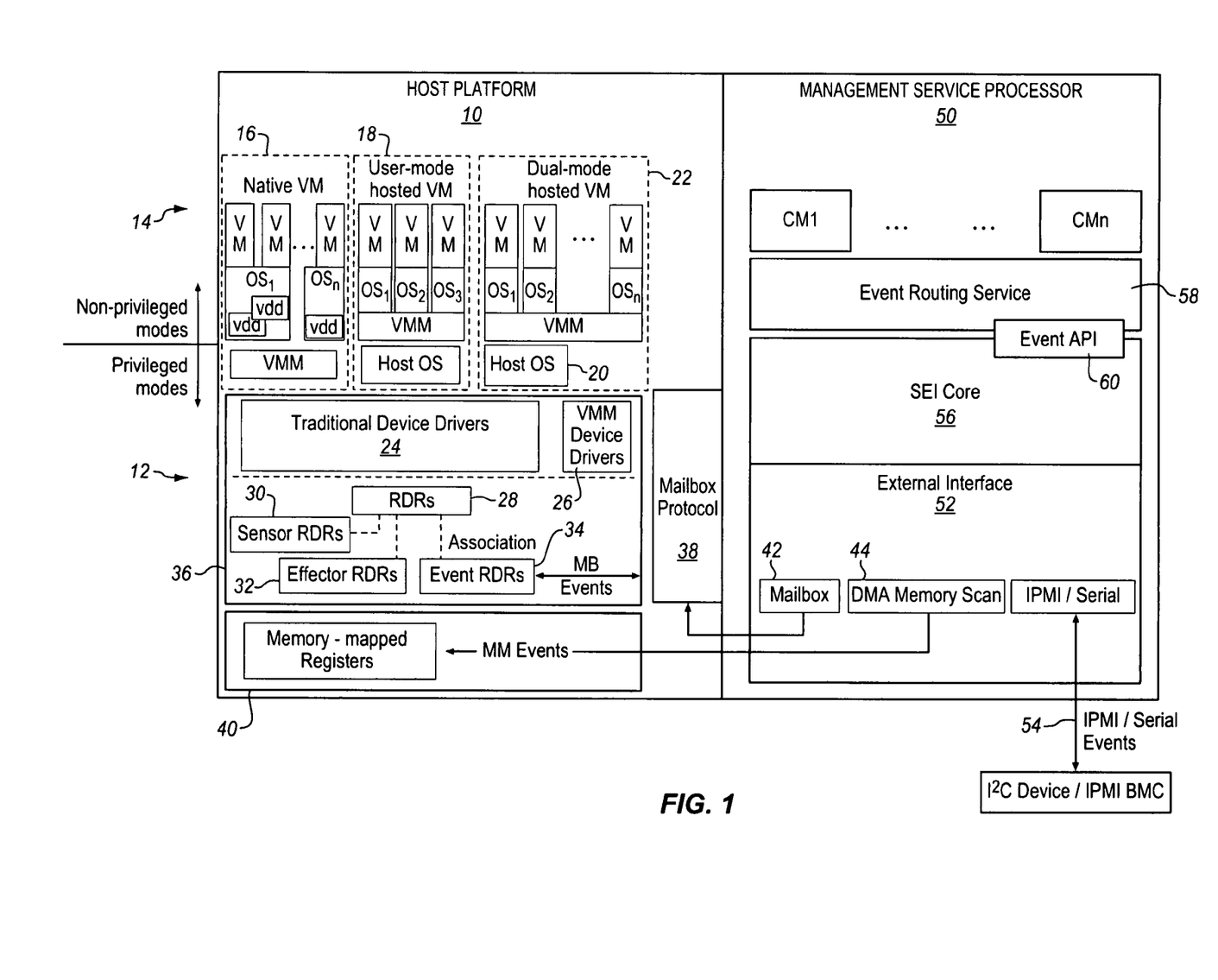
FIG. 1 is a diagram of a VMM management architecture in which a host platform 10 supports different VMM configurations according to an embodiment of the invention.

A Virtual Machine Monitor (VMM) can be essentially configured into three different types as depicted in FIG. 1. FIG. 1 shows a VMM management architecture in which a host platform 10 supports different VMM configurations. The host platform has privileged modes 12 and non-privileged modes 14.

In a native VM system 16, the VMM operates in the privileged mode. A guest operating system or systems OS 1 to OS n runs on top of the VMM that executes the user applications.

In a user-mode hosted VM system 18, the VMM sits on the host operating system 20 and utilizes the functions already available on the host OS to control and manage resources desired by each of the Virtual Machines. In this case, the VMM is implemented in a non-privileged or user mode.

In a dual-mode hosted VM system 22, the host OS is modified to extend the functionality of an OS, such as kernel extensions or device drivers. Here, parts of the VMM operate in privileged mode along with the host OS and other parts operate in the non-privileged mode.

The host platform 10 has a VM system 36 with a variety of resources available to it. The resources may include traditional device drivers 24 for operating all of the host's peripheral devices. Additional device drivers for VMM operations that are not already available in the host OS are provided for in the VMM device drivers 26. The VM system also includes a variety of RDR modules to convert events into a standardized format from the form of the drivers. The modules may include one or more of a parent RDR 28, a sensor RDR 30, an effector RDR 32, and an event RDR 34, among others. The event RDR is coupled to a mailbox protocol 38 to communicate events to an external mailbox 42.

The host platform also includes a DMA (Direct Memory Access) system memory as a resource to the other components of the host platform. The system memory has an interface to a DMA memory scanner 44, through which memory mapped events may be communicated.

The host platform communicates with a management service processor 50 which may reside in the same location or remotely from the host platform. The management service processor operates independently of the host platform to perform repairs, service updates and to perform monitoring. It includes an external interface 52, such as an SEI (Sensor Effector Interface) that may host a mailbox interface 42 to the mailbox protocol of the host platform and a DMA memory scan interface to the host platform.

In addition, an IPMI or serial interface 54 may provide a connection to system administrator resources. This interface may operate in a variety of different ways depending on the application, including through a direct serial connection, a local area network connection (LAN), and a serial over LAN connection, among others. Through this connection, a system administrator may use IPMI messaging or some other messaging system to query platform status, to review hardware logs, or to issue other requests from a remote console (not shown). The management service processor may also sends alerts, such as a platform event trap (PET) using, for example simple network management protocol (SNMP). For complex or sensitive systems, the communications may be managed by a BMC (Baseboard Management Controller) or other hardware asset to ensure reliability.

The management service processor also includes its own processing core 56 that is coupled to an event routing service 58 with access to a variety of different CM's (Capability Modules) CM1 to CMn. Event APIs (Application Programming Interface) 60 may be passed between the event routing service, the CMs and the core to provide special functionality.

Different types of VMMs on host processor(s) may alternatively be operated from an isolated service processor. Traditional VMMs may not support the interfaces that may be required by a management service processor to monitor and manage VMMs. So existing VMMs may be instrumented to enable their manageability from an isolated Management Platform. iAMT's generic data structure called RDR (Resource Data Record) may be used to describe managed resources on the host software as well as hardware in a consistent manner with minimal changes within the VMM itself. However, other data structures may alternatively be used. The management scheme is independent of the VMMs running on the host processor or processors.

In a VM System, the VMM virtualizes physical processors, memory, I/O and network resources and shares them between different Virtual Machines (VM). In order to remotely manage these different host processor resources. Access to different hardware and software monitoring information, usage statistics, etc., may be used for individual resources. Traditional VMMs have significant potential in terms of collecting various kinds of management rich information for all the managed resources. However, this information may not be retained and may be lost.

If the information is instead collected in a flexible manner, then it may be used for management decisions by iAMT capability modules by converting it to a standard format, such as RDR, a remote service processor (running iAMT) may decipher that data for management purposes. While the description is presented in the context of iAMT and RDR other formats and protocols may be used instead.

A VMM may be instrumented for I/O manageability. A virtualization strategy for a given I/O device type may include constructing a virtual version of the device and then virtualizing the I/O activity directed at the device. A virtual device given to a guest VM is typically (but not necessarily) supported by a similar, underlying physical device. When a guest VM makes a request to use the virtual device, the request may be intercepted by the VMM and converted from a virtual device action to a real device action.

One example of virtualization may be applied to a Network Interface Adapter. For purposes of this example, the Virtual Network Interface Card (NIC) is of the same type as a physical NIC in the host system. A request to send a message to an external computer system typically consists of a number of I/O operations, such as OUT and OUTS instructions in an IA-32 ISA (Intel Architecture 32-bit Instruction Set Architecture). Associated with an OUT or OUTS instruction is a port number, such as 0xf0, which is a number in the range of IDs designated for the NIC (virtual) in the guest system. Also associated with each NIC is a state bit that indicates whether the system should trap in response to an I/O request for that port.

As part of the state of the virtual machine, the VMM saves the permission map for all ports of the guest machine. The OUTS instruction is a privileged instruction, so when an OUTS instruction is executed, the system traps to the VMM, which examines the permission bitmap of the current guest. If the permission is set, the VMM converts the request to a new OUTS instruction for e.g. port 0x280, corresponding to the NIC port on the real machine. It also converts the virtual address pointing to the string of data to be moved to a virtual address in the VMM space pointing to the same string of data or a copy. The VMM ensures that port 0x280 is enabled in its own permission map and issues the new OUTS instruction. When executed, now in the VMM's privileged mode, this OUTS instruction traps to the device driver 26 installed on the VMM for the NIC, which then performs the desired transfer (1-410,411). The I/O request from the guest virtual machine is finally executed by the associated NIC device driver 24.

RDR definitions may be set out for NIC specific device drivers as well as for other drivers. A set of RDRs 28, 30, 32, 34 may be used to instrument the NIC device driver 24 responsible for controlling the physical NIC resource. A flow cache associated with the NIC acts as a counter that maintains statistics of the network traffic flows. This information can be used to determine for example, if a network connection was being used to propagate an attack across the network and shut down or filter network traffic from that machine based on that analysis. Five or more different types of RDRs may be used to expose the statistics collected by the Flow Cache in the standard format for use by the management platform. An example of possible RDRs include:

Entity RDR 28: The NIC card is identified by its particular MAC address. This is the parent RDR 28 associated with the other sensor 30, effector 32, and event 34 RDRs related to this entity. This RDR may contain information on the entity path and direct the CM contacting any associated sensor RDR to its location, i.e the entity path.

Sensor RDR 30: The Flow Cache may have the following details on every packet: destination IP address; source IP address; destination port; source port; protocol type (TCP (Transmission Control Protocol), UDP (User Datagram Protocol), ICMP (Internet Control Message Protocol), etc); TCP flags; and ICMP flags. Each row of the cache may be exported as an individual sensor RDR. Other general statistical information from the flow cache that may be exposed as sensor RDRs are transmitted packets count, number of ICMP errors recorded, number of unique destination addresses, number of unique destination ports, number of unique source ports etc. Thus, by querying the Flow Sensor RDR for transmitted packet counts, the interested CM can obtain the statistics related to the number of packets transmitted from the host in a few milliseconds.

Effector RDR 32: Effectors may be responsible for taking corrective action to an undesirable scenario. For example, if abnormal traffic is detected out of the host machine, the CM may impose an effector to filter or drop all TCP packets. Some possible effector RDRs for this entity RDR may be TCP drop filter, UDP drop filter, ICMP drop RDR; etc. Effector RDRs may also be provided to control each filter individually such as TCP drop for specific source ports, etc.

Event RDR 34: The Event RDR may generate events asynchronously such as sending message to a management console to inform a system administrator of irregular network traffic patterns that could be generated by a malicious self-propagating worm.

Association RDR (not shown): This RDR may associate two different RDRs. This RDR may be used to aid the other RDRs in the information co-relation process, among other uses.

Figure 2:
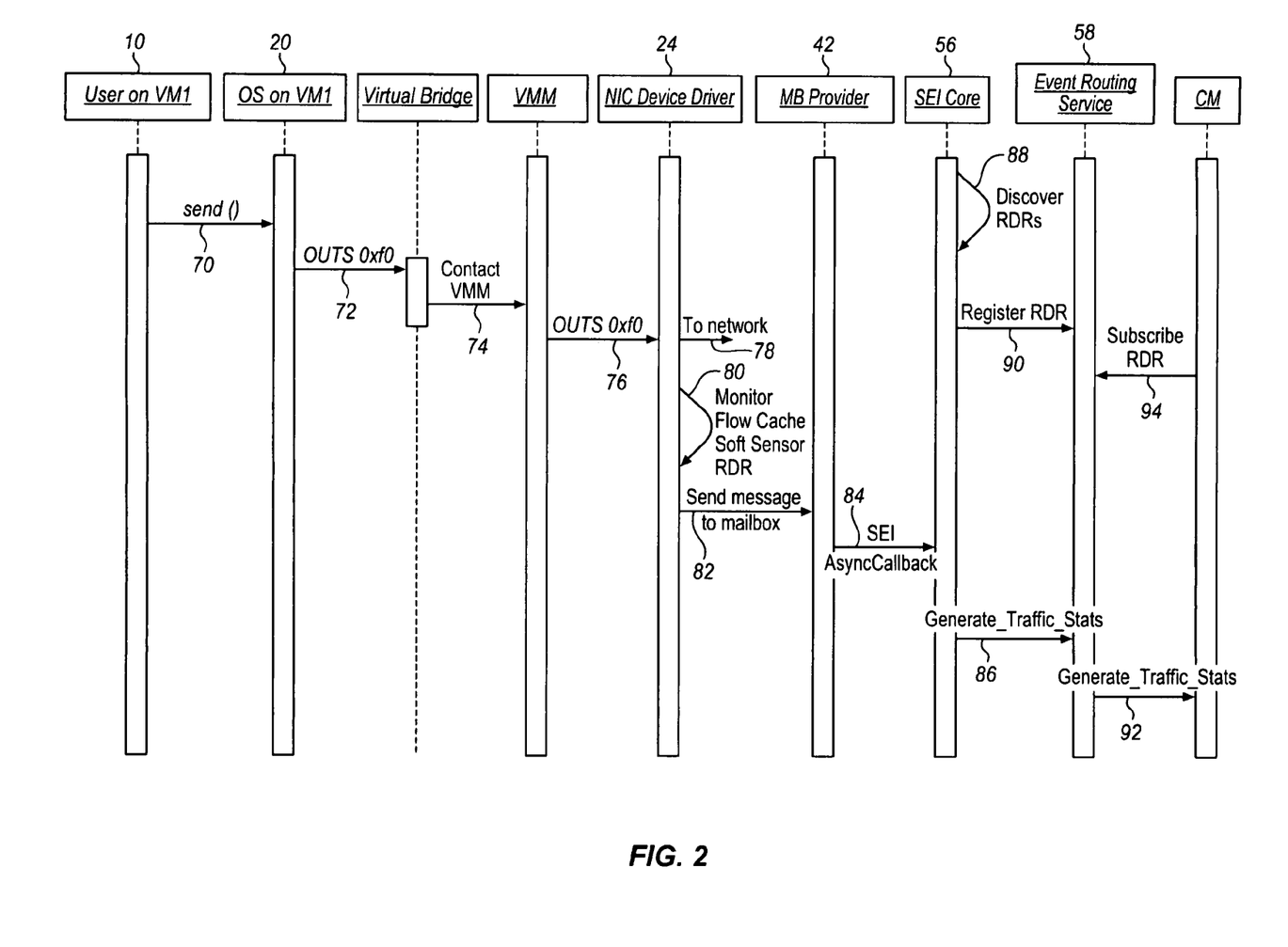
FIG. 2 is a sequence diagram depicting an example of exposing statistics to trigger necessary actions according to an embodiment of the invention.

FIG. 2 is a sequence diagram depicting an example of a manner in which a NIC device driver may be instrumented to expose statistics collected by the Flow Cache in the form of sensor RDRs which may then be used by the management CM to trigger necessary actions (e.g. generate traffic statistics to a system administrator) by using Effector RDRs 32.

In general, a messaging sequence in FIG. 2 begins with a user, that is the host platform 10, on a VM sending a message to an external machine. The message may, for example be an I/O instruction to an external interface, such as a NIC. The message is captured in the OS 20 and converted to an instruction 72 to the NIC, such as OUTS 0xf0, discussed above. This instruction is received by the virtual bridge and sent as a message 74 to the VMM (Virtual Machine Monitor). The VMM sends the packet 76 from the virtual bridge to the physical device driver 24 of the NIC. The NIC device driver then launches the packet to the network.

At the same time, the event is monitored 80 by a sensor RDR 30, such as a flow cache soft sensor. The sensor RDR, through for example, a parent RDR and an event RDR signals the event 82 through a mailbox protocol 38 to a mailbox provider 42 of a management service processor 50. The mailbox provider of the external interface provides an asynchronous callback 84 to the service processor core 56. At the service processor core, all of the services of the management service processor may be made available. Traffic statistics 86 may be generated and sent to the event routing service 58 and then to a CM. These statistics may later be reported to a remote system administrator.

In a separate process stimulated by the traffic event, the core may generate a message 88 to discover any RDRs on that event or other events. This may be applied as a register RDR message 90 to the event routing service 58. The event routing service may then gather any subscriptions from the CMs, for example. This data may be used in generating and reporting statistics as well.

Different types of VM Systems may be instrumented for I/O manageability. Native VM System: Instrumenting the native VM System is described above. Device requests by a VM application may be converted by the guest OS running within that VM into a corresponding call to a virtual device driver supported by the guest OS. The VMM intercepts this call to the virtual device drivers, translates the virtual device information to the underlying physical device and redirects the call to the driver program for the physical device. The VMM may then support special virtual device drivers (one per device type) for each guest OS and that are installed when the guest OS is installed.

The VMM may support real device drivers for each of the devices attached to the system. This may be accomplished by "borrowing" the drivers (and driver interface) from an existing operating system. These "borrowed" device drivers are depicted as traditional device drivers in FIG. 1. Instrumenting these traditional device drivers with RDRs by using the NIC device driver as an example has been described above.

Dual-Mode Hosted VM System: For a dual-mode hosted VM system, part of the VMM runs natively on the hardware; another part of the VMM runs as a user application on the host OS in order to invoke resource allocation services provided by the host. In a dual-mode hosted VM system, when a guest VM makes an I/O request, that request is converted by the native-mode portion of the VMM (called VMM-n) into a user application request made to the host OS. Thus the user-mode portion of the VMM (called VMM-u) makes resource requests to the host OS on behalf of the n-VMM. The dual-mode host VM uses a VMM driver (called VMM-d) to provide the link between VMM-u and VMM-n.

A user-mode hosted VM system may work in a similar way to the dual-mode hosted VM system, except that it does not have the VMM-n component and invokes the host OS for all I/O requests coming from the host VMs by making user-application requests to the host OS. An example would be to issue the read( ) request to the host OS in response to a request by the host VM to fetch sectors from a disk.

Hosted VM systems are not required to provide device drivers in the VMM; the device drivers that are already present in the host OS may be used indirectly by the VM system. This is depicted as traditional device drivers 24 in FIG. 1. However, the VMM-n in a dual-mode VM system may provide a small set of device drivers for devices that are either performance critical, or that do not have drivers already available in the host OS system. This is depicted as VMM device drivers 26 in FIG. 1.

Thus a Dual-Mode Hosted VM System may be instrumented the same way as Native VM Systems. In this case, as in Native VM Systems, the traditional and VMM device drivers may be instrumented using the RDR data structures described above.

Figure 3:
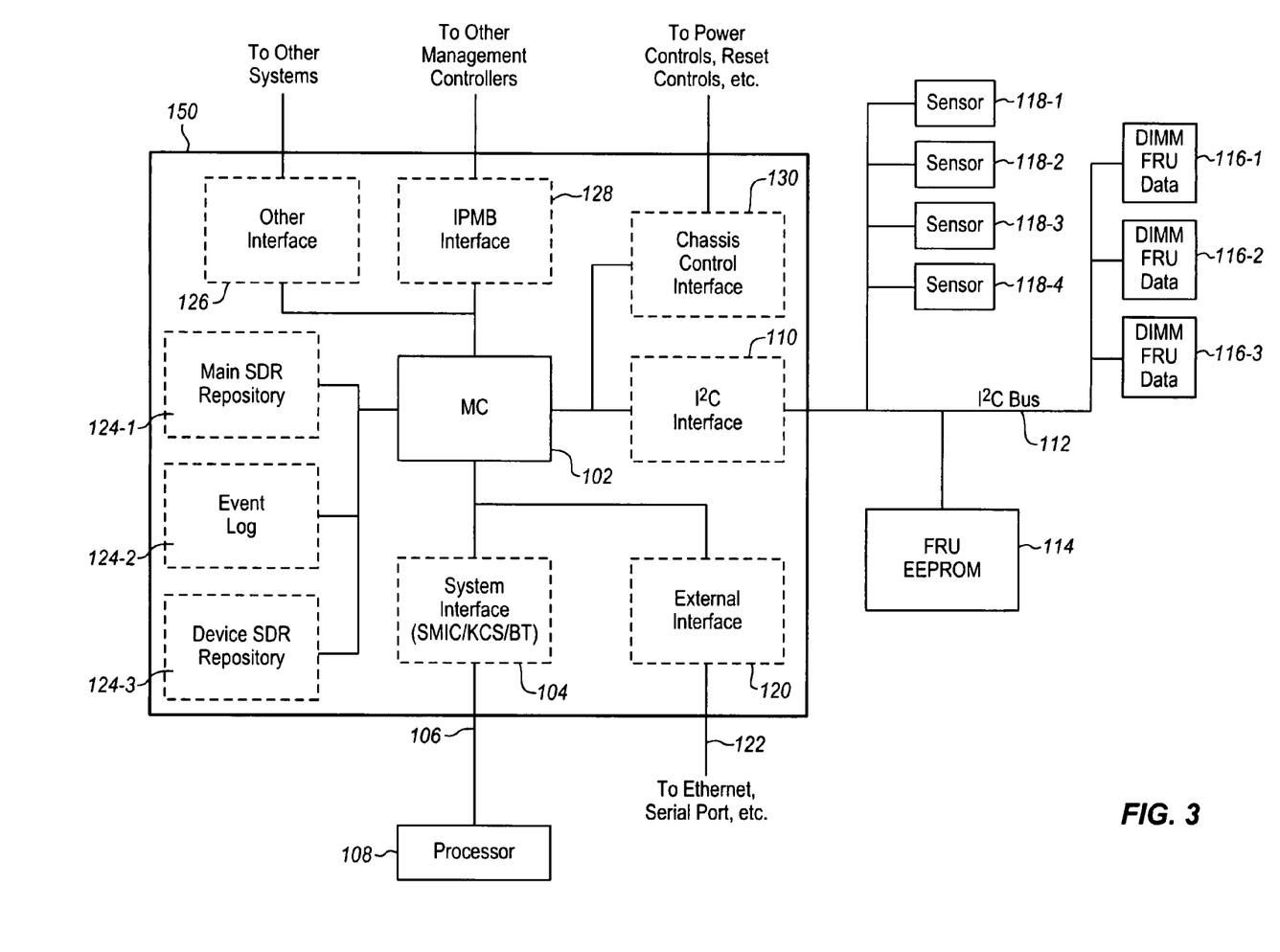
FIG. 3 is a diagram of a baseboard management controller with its internal components and interfaces to a computer system upon which it may be hosted according to an embodiment of the present invention.

FIG. 3 shows an example of a baseboard management controller 50 with its internal components and interfaces to a computer system upon which it may be hosted. The BMC may be provided on a motherboard of a host system or as a discrete external device. The components shown in FIG. 3 may be incorporated into a single chip or group of chips or may be distributed to a variety of other unique or shared components.

At the heart of the BMC is a management core 102 or service processor. In one embodiment, the MC is powered and operational whenever power is applied to the motherboard or system board just by plugging the system into the power mains. This allows the system to be serviced, maintained, or repaired even when the system is turned off or does not start. The system may be managed either locally, using the system interface 104 or remotely through an external interface 120.

The system interface may provide connectivity, for example with SMIC (System Management Interface), KCS (Keyboard Controller Style), or BT (Block Transfer), among others. The external interface may provide connectivity via an Ethernet port. The MC can also communicate with other MCs using the IPMB (Intelligent Platform Management Bus) interface 128.

The MC 102 is further coupled to an inter-component bus interface such as an I$^2$C (Inter-Integrated Circuit of Philips Semiconductors) interface 110 to an external I$^2$C bus. The inter-component bus may be provided on the motherboard separate from any high speed buses to provide a sensor interface for any of the components of the system. For example, the inter-component bus may couple to a EEPROM (Electrically Erasable Programmable Read Only Memory) that stores information from a variety of different FRUs (Field Replaceable Units). In one example, the FRU EEPROM has a controller that allows it to gather data over the inter-component bus. The FRU EEPROM may then be periodically polled by the bus interface 110 to gather the data for storage.

The inter-component bus may also be coupled to system memory or other devices. In the example of FIG. 3, system memory includes three DIMMs (Dual Inline Memory Module) 116-1, 116-2, 116-3. The inter-component bus may also be coupled to a variety of different sensors, indicated here as 118-1, 118-2, 118-3, 118-4. The sensors may include temperature, voltage, fan speed, hardware status, power state, line or pin state or any of a variety of other parameters. The sensors may gather raw data directly from a discrete sensor or the sensor data may reflect a processed or calculated value, such as an average, a rating, or a minimum or maximum accumulated over time.

The data gathered on the inter-component bus may be applied by the MC 102 to data repositories. In the present example, the repositories receive data in the form of RDRs, however, any other format may be used. The repositories in FIG. 3 include a main SDR repository 124-1, an event log 124-2, and a device SDR repository 124-3. The contents and applications of these repositories are provided in greater detail above. These repositories are indicated with dotted lines to show that they may be a part of the VM system 36 as shown in FIG. 1. The data in these repositories is readily available for any and all VM processes. The data, however, may also be collected and managed by the management service processor 102.

To allow remote access, the BMC may include a wide variety of different external interfaces. The example of FIG. 3 includes an external interface 120 that may allow for remote access to the BMC from Ethernet, serial or other external network or service interfaces 122. This interface may be allowed to operate when the system is powered off so that a remote administrator may communicate with the BMC for repairs without requiring the OS or a successful boot.

An IPMB (Intelligent Platform Management Bus) interface 128 may be used to communicate with other devices or controllers on the system board or connected to the system including external drives and storage devices. The IPMB bus may be used as an interface between the BMC and devices that use other protocols, languages or interfaces.

A chassis control interface 130 may provide a connection to power controls, reset controls, power supplies and other devices. Through this connection, the BMC may be able to start, restart or shut down the system as well as determine and change the current state of power and reset controls. There may also be other external interfaces 126 to other devices, depending on the application. The external interfaces are shown in dotted lines to indicate that they may be resident on the host platform 10 of FIG. 1. These may accordingly be shared resources that the management service processor, in effect, borrows from the host platform as needed.

Figure 4:
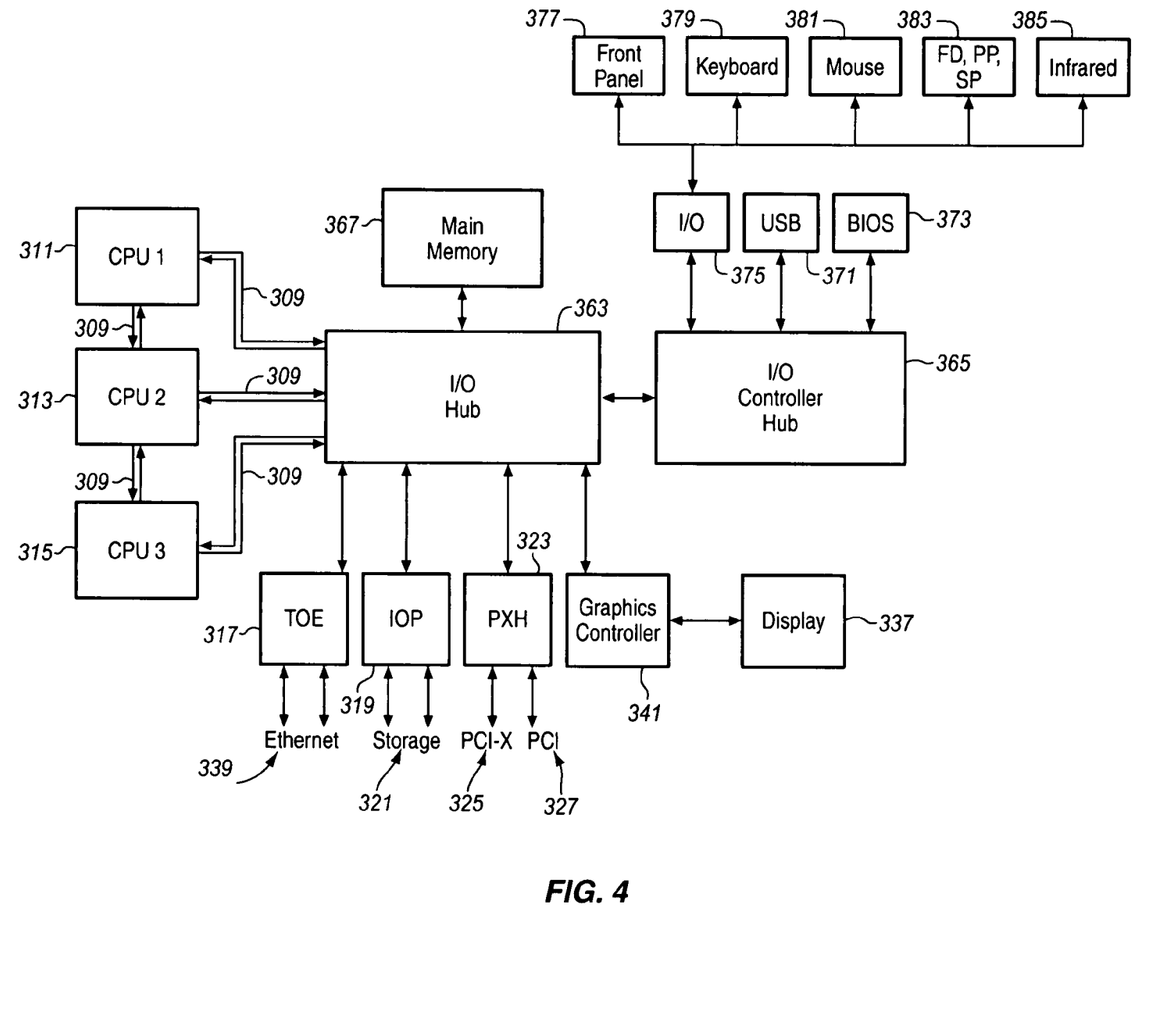
FIG. 4 is a diagram of a computer system which may host the baseboard management controller of FIG. 3 according to an embodiment of the present invention.

FIG. 4 shows an example of a computer system suitable for implementing the present invention. An IOH (Input/Output Hub), north bridge, or host controller 363 interfaces one or more CPUs (central processing unit) with memory and I/O devices and may provide a wide range of other features such as increased performance, reliability, availability and serviceability, and system management. It may include I/O clusters, a memory controller, snoop filters, and a wide range of logic for handling transactions. While the example of FIG. 4, includes a microprocessor coupled to an IOH and an ICH (Input/Output Controller Hub), either the IOH or the ICH or both or any of the functions of these chips may be incorporated into any one or more of the microprocessors. The IOH and the ICH may also be combined, in whole or in part, inside of or outside of the microprocessor.

In the example of FIG. 4, the IOH 363 has a communications link 309 for each of three CPUs or processor cores 311, 313, 315 (shown in FIG. 3 as 108). More or less than one IOH, three processor cores and communications links may be used. Alternatively, the communications links may be removed so that all of the CPUs communicate through one of the other CPUs or the IOH.

The IOH provides additional connectivity to other devices. There is an interface to system memory 367 (shown in FIG. 3 as 116), such as DIMMs (Dual In-line Memory Modules) in which instructions and data may be stored, and a high speed interface, such as PCI (peripheral component interconnect) Express. The PCI Express interface may be used to couple to a variety of different high and low speed devices. In the example of FIG. 4, six PCI Express x4 lanes are shown. Two lanes connect to a TCP/IP (Transmission Control Protocol/Internet Protocol) Offload Engine 317 which may connect to network or TCP/IP devices such as a Gigabit Ethernet controllers 339 (shown in FIG. 3 as 122). Two lanes connect to an I/O Processor node 319 which can support storage devices 321 using SCSI (Small Computer System Interface), RAID (Redundant Array of Independent Disks) or other interfaces. Two more lanes connect to a PCI translator hub 323 which may support interfaces to connect PCI-X 325 and PCI 327 devices. Two, four or more lanes of PCI Express couple to a graphics controller 341 to render images or video on a display 337. The PCI Express interface may support more or fewer devices than are shown here. In addition, the IOH may be adapted to support other protocols and interfaces instead of, or in addition to those described.

The IOH may also be coupled, using PCI Express or another bus to an ICH. The ICH 365 offers possible connectivity to a wide range of different devices. Well-established conventions and protocols may be used for these connections. Alternatively, these connections may be provided using the PCI interface 327 or another interface. The connections may include a SIO (Super Input/Output) port 375, a USB hub 371, and a local BIOS (Basic Input/Output System) flash memory 373. The SIO (Super Input/Output) port 375 may provide connectivity for a front panel 377 with buttons and a display, a keyboard 379, a mouse 381, and infrared devices 385, such as IR blasters or remote control sensors. The I/O port may also support floppy disk, parallel port, and serial port connections 383. Alternatively, any one or more of these devices may be supported from a USB, PCI or any other type of bus or interconnect. Wireless interfaces such as Bluetooth and WiFi may also be supported from any one or more of these busses.

The particular nature of any attached devices may be adapted to the intended use of the device. Any one or more of the devices, buses, or interconnects may be eliminated from this system and others may be added. For example, video may be provided on the PCI bus, on an AGP bus, through the PCI Express bus or through an integrated graphics portion of the host controller or a processing core.

The BMC of FIG. 3 may be supported as a PCI 327 device or as a standalone device coupled to the IOH 363 or the ICH 365 through its system interface 106. The other sensor and monitor connections 112, 118 of FIG. 3 are not shown in order to avoid obscuring the Figure.

A lesser or more equipped management controller, computer system, data structure, data record, repositories and logs, and signaling process than the examples described above may be preferred for certain implementations. Therefore, the configuration of any one or more of these items will vary from implementation to implementation depending upon numerous factors, such as price constraints, performance requirements, technological improvements, or other circumstances. Embodiments of the invention may also be applied to other types of software-driven systems that use different hardware architectures than those shown in the Figures.

While embodiments of the invention have been described in the context of event monitoring and maintenance embodiments of the invention may also be applied to repair, inventory, quality evaluation and also to other types of processes. Embodiments of the invention may also be applied to a wide variety of different hardware with different architectures and communication protocols.

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various steps. The steps of the present invention may be performed by hardware components, such as those shown in the Figures, or may be embodied in machine-executable instructions, which may be used to cause general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program an agent or a computer system to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of machine-readable media suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and apparatus are described in their most basic form but steps may be added to or deleted from any of the methods and components may be added or subtracted from any of the described apparatus without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

What is claimed is:

1. A method comprising:
generating a device event on a virtual machine of a computer system;
converting the device event to an instruction for a virtual device driver;
receiving the instruction for the virtual device driver at a virtual machine monitor of the computer system;
sending the received instruction from the virtual machine monitor to a device for execution as an instruction for a physical device driver corresponding to the device;
monitoring the device event on the computer system at a sensor of a virtual machine management system residing on the computer system;
receiving a record of the event from the sensor at the virtual machine monitor;
generating a record of the event in a generic data format at the virtual machine monitor;
signaling the event from the virtual machine monitor to a mailbox interface of the management system, wherein the mailbox interface is an interface to external agents;
storing the record in the generic data format in a mailbox coupled to the mailbox interface to be reported to one of the interfaced external agents; and
sending the stored record from the mailbox to an event routing service of the management system.

2. The method of claim 1, wherein the sensor is a flow cache soft sensor.

3. The method of claim 1, wherein the event is an input/output instruction to an external interface.

4. The method of claim 1, wherein signaling the event comprises signaling the event through a mailbox protocol to a mailbox provider of the management system.

5. The method of claim 4, wherein the mailbox provider in response to signaling the event provides an asynchronous callback to a service processor core of the management system.

6. The method of claim 5, further comprising generating traffic statistics at the service processor core in response to the asynchronous callback and sending the traffic statistics to the event routing service.

7. The method of claim 6, further comprising sending the traffic statistics from the event routing service of the management system to a capability module.

8. The method of claim 6, further comprising reporting the traffic statistics to a remote system administrator.

9. The method of claim 6, wherein reporting the traffic statistics to a remote administrator comprises gathering subscriptions from capability modules and reporting the traffic statistics based on the subscriptions.

10. The method of claim 1, further comprising sending a request to the event routing service for all data records for the event and reporting the data records to a remote system administrator.

11. A machine-readable storage medium having instructions stored thereon that when executed by a machine cause the machine to:
generate a device event on a virtual machine of a host platform;
convert the device event to an instruction for a virtual device driver;
receive the instruction for the virtual device driver at a virtual machine monitor of the host platform;
send the received instruction from the virtual machine monitor to a device for execution as an instruction for a physical device driver corresponding to the device;
sense the device event at a sensor on the host platform;
receive records of the device event from the sensor at the virtual machine monitor;
translate the records to a generic data structure;
send the translated records from the virtual machine monitor to a mailbox interface of a management service processor, wherein the mailbox interface is an interface to external agents;
store the records in the generic data structure in a mailbox of the service processor coupled to the mailbox interface; and
report the stored records from the mailbox of the service processor to one of the interfaced external agents.

12. The medium of claim 11, the instructions further causing the machine to accumulate statistics in the service processor for a plurality of translated events and report the accumulated statistics to the external agent.

13. The medium of claim 11, wherein sending the translated records comprises sending the translated records from the virtual machine monitor to the service processor.

14. The medium of claim 13, wherein sending the translated records comprises sending the translated records without the virtual machine monitor determining the source of the activity.

15. The medium of claim 11, wherein sending the translated records comprises sending the translated records to an event module and wherein reporting comprises the event module responding to discovery messages from the service processor.

16. The medium of claim 11, wherein the service processor resides on the host platform.

17. An apparatus comprising:
a plurality of sensors of a virtual machine management system to detect conditions on a plurality of different virtual machines of a host computer system;
a sensor interface of a virtual machine monitor to convert sensor readings on the plurality of virtual machines to a generic data format independent of any one virtual machine;
a repository of the management system to receive the converted sensor readings from the virtual machine monitor and to store the generic data format sensor readings; and
a management service processor having an external mailbox interface to report the stored sensor readings to an external agent through the mailbox interface.

18. The apparatus of claim 17, wherein the management service processor operates independently of the host system.

19. The apparatus of claim 17, further comprising a mailbox provider coupled through a mailbox protocol of the host computer system to receive events regarding sensor readings and store the events in the repository.

20. The apparatus of claim 17, further comprising an event routing service of the management service processor to monitor subscriptions to stored sensor readings and to provide stored sensor readings to respective subscribers.

* * * * *